(12) United States Patent
Liu

(10) Patent No.: US 11,294,249 B2
(45) Date of Patent: Apr. 5, 2022

(54) LIQUID CRYSTAL DISPLAY PANEL AND MANUFACTURING METHOD

(71) Applicant: TCL CHINA STAR OPTOELECTRONICS TECHNOLOGY CO., LTD., Shenzhen (CN)

(72) Inventor: Junzheng Liu, Shenzhen (CN)

(*) Notice: Subject to any disclaimer, the term of this patent is extended or adjusted under 35 U.S.C. 154(b) by 209 days.

(21) Appl. No.: 16/619,475

(22) PCT Filed: Oct. 29, 2019

(86) PCT No.: PCT/CN2019/113982
§ 371 (c)(1),
(2) Date: Dec. 5, 2019

(87) PCT Pub. No.: WO2021/035927
PCT Pub. Date: Mar. 4, 2021

(65) Prior Publication Data
US 2021/0356823 A1    Nov. 18, 2021

(30) Foreign Application Priority Data
Aug. 27, 2019    (CN) .......................... 201910793636.9

(51) Int. Cl.
*G02F 1/1362* (2006.01)
*G02F 1/1333* (2006.01)

(52) U.S. Cl.
CPC ...... *G02F 1/136222* (2021.01); *G02F 1/1333* (2013.01); *G02F 1/136286* (2013.01); *G02F 2201/50* (2013.01)

(58) Field of Classification Search
None
See application file for complete search history.

(56) References Cited

U.S. PATENT DOCUMENTS

| | | | |
|---|---|---|---|
| 2004/0135952 A1 | 7/2004 | Kurashina et al. | |
| 2005/0134754 A1 | 6/2005 | Yang et al. | |
| 2015/0092142 A1 | 4/2015 | Zhang et al. | |
| 2015/0311232 A1* | 10/2015 | Sun | H01L 27/124 257/72 |
| 2016/0247825 A1* | 8/2016 | Katsuta | H01L 27/1222 |
| 2017/0168347 A1 | 6/2017 | Li | |
| 2018/0284517 A1 | 10/2018 | Wu et al. | |
| 2019/0267408 A1 | 8/2019 | Chen | |
| 2019/0369449 A1* | 12/2019 | Qin | G06F 3/0412 |

FOREIGN PATENT DOCUMENTS

| | | |
|---|---|---|
| CN | 1499277 A | 5/2004 |
| CN | 102902095 A | 1/2013 |
| CN | 104965365 A | 10/2015 |
| CN | 108181765 A | 6/2018 |
| CN | 108333845 A | 7/2018 |

* cited by examiner

*Primary Examiner* — Richard H Kim

(57) ABSTRACT

A liquid crystal display panel is disclosed. The liquid crystal display panel includes an array substrate. The array substrate includes: a glass substrate, a first metal layer, a gate insulating layer, a second metal layer, a first ITO layer, a first passivation layer, and a second passivation layer. The second metal layer has a first sub-metal block and a second sub-metal block, wherein the first ITO layer is further covered by an optical spacer, and the first ITO layer is electrically connected to the first metal layer and the second metal layer, respectively.

8 Claims, 4 Drawing Sheets

LIQUID CRYSTAL DISPLAY PANEL AND MANUFACTURING METHOD

FIELD DISCLOSURE

The present disclosure is related to the field of display techniques, and in particular to a liquid crystal display panel and a manufacturing method.

BACKGROUND OF DISCLOSURE

With the development of display technology, flat plane displays, such as liquid crystal display panel (LCD) are widely used in mobile phones, televisions, personal digital assistants, digital cameras, notebook computers, desktop computers, and other electronic products, due to their advantages, such as high image quality, power conservation, thinness, a wide range of applications, etc. A moulding process of the liquid crystal display panel generally includes an array process (a film, a yellow light, an etching, and a stripping) in an early phase-filter substrate) in an intermediate phase, and a module assembly process (a drive chip and a printed circuit board) in a late phase. Currently, in the array process in the early phase, a plurality of via holes are designed in the liquid crystal display panel, and a main function of the design is to achieve conduction between a gate and a source drain through pixel electrodes. However, along with designs of a narrow frame and an overload frame of the liquid crystal display panel, a range of applications for the via hole design in the liquid crystal display panel is becoming wider. At present, in the structural design of the via holes of the liquid crystal display panel, an indium tin oxide (ITO) layer on a side of the color filter substrate is bent under external force, and, thereby, the ITO layer on the side of the color filter substrate is in contact with an ITO layer on a side of the array substrate, causing the pixel electrode to short-circuit, further resulting in a black screen phenomenon on the liquid crystal display panel.

In summary, in the existing liquid crystal display panel and the manufacturing method thereof, the ITO layer on the side of the color filter substrate is bent under the external force, and, thereby the ITO layer on the side of the color filter substrate is in contact with an ITO layer on the side of the array substrate, causing the pixel electrode to short-circuit, further resulting in a black screen phenomenon on the liquid crystal display panel.

SUMMARY OF INVENTION

Technical Problems

In an existing liquid crystal display panel and the manufacturing method thereof, an indium tin oxide (ITO) layer on a side of the color filter substrate is bent by external force, and, thereby, the ITO layer on the side of the color filter substrate is in contact with an ITO layer on a side of a array substrate, causing the pixel electrode to short-circuit, further resulting in a black screen phenomenon on the liquid crystal display panel.

Technical Solutions

The present disclosure provides a liquid crystal display panel and manufacturing method thereof, which can protect a via hole structure corresponding to an array substrate from external force and short circuiting of the pixel electrodes, so as to solve the technical problems in the existing liquid crystal display panel and manufacturing method thereof, that the ITO layer on the side of the color filter substrate is bent by the external force, and, thereby, the ITO layer on the side of the color filter substrate is in contact with an ITO layer on the side of the array substrate, causing the pixel electrode to short-circuit, further resulting in the black screen phenomenon on the liquid crystal display panel.

In order to solve the problems as described above, the present disclosure provides the technical solutions as below:

The present disclosure provides a liquid crystal display panel, including an array substrate and a color filter substrate disposed opposite to each other, and a liquid crystal layer disposed between the array substrate and the color filter substrate, wherein the array substrate includes: a glass substrate, a first metal layer, a gate insulating layer, a second metal layer, a first indium tin oxide (ITO) layer, a first passivation layer, and a second passivation layer, wherein the second metal layer has a first sub-metal block and a second sub-metal block, the first sub-metal block are alternately arranged with and spaced apart from the second sub-metal block, the first passivation layer has a first via hole and a second via hole;

wherein, the first ITO layer is further covered with an optical spacer, the first ITO layer is electrically connected to the first metal layer through the first via hole, and the first ITO layer is electrically connected to the second sub-metal block through the second via hole.

In the liquid crystal display panel provided by the embodiment of the present disclosure, the first via hole exposes the first metal layer by a part of the first passivation layer and the gate insulating layer, and the second via hole exposes the second sub-metal block by a part of the first passivation layer.

In the liquid crystal display panel provided by the embodiment of the present disclosure, a material of the spacer is organic resin.

In the liquid crystal display panel provided by the embodiment of the present disclosure, a thickness of the first sub-metal block is the same as a thickness of the first passivation layer.

In the liquid crystal display panel provided by the embodiment of the present disclosure, an upper surface of the optical spacer is aligned with an upper surface of the first passivation layer.

In the liquid crystal display panel provided by the embodiment of the present disclosure, the second passivation layer is disposed on the first passivation layer and completely covers the first sub-metal block and the optical spacer.

In the liquid crystal display panel provided by the embodiment of the present disclosure, the color filter substrate is further provided with a second ITO layer near a side of the array substrate.

The present disclosure further provides a manufacturing method for liquid crystal display panel, including:

S10, providing a glass substrate on which a first metal layer and a gate insulating layer are sequentially formed, wherein the gate insulating layer completely covers the first metal layer;

S20, forming a second metal layer and a first passivation layer on the gate insulating layer, wherein the second metal layer has a first sub-metal block and a second sub-metal block, the first sub-metal block is alternately arranged with and spaced apart from the second sub-metal block, an upper surface of the first sub-metal block is aligned with an upper surface of the first passivation layer, and the first passivation layer completely covers the second sub-metal block;

S30, patterning the first passivation layer by a reticle mask process, wherein a first via hole, second via hole and a recess are formed on the first passivation layer;

S40, forming a first ITO layer on the recess of the first passivation layer, wherein the first ITO layer is electrically connected to the first metal layer through the first via hole, the first ITO layer is electrically connected to the second sub-metal block through the second via hole;

S50, covering the first ITO layer with an optical spacer, wherein an upper surface of the optical spacer is aligned with an upper surface of the first passivation layer, and then a second passivation layer is formed on the first passivation layer to obtain an array substrate;

S60, providing a color filter substrate, wherein a liquid crystal is injected into the color filter substrate adjacent to a side of the array substrate, and the color filter substrate and the array substrate are grouped to obtain a liquid crystal display panel.

In the manufacturing method for liquid crystal display panel provided by the embodiment of the present disclosure, the first via hole exposes the first metal layer by a part of the first passivation layer and the gate metal layer, and the second via hole exposes the second sub-metal block by a part of the first passivation layer.

In the manufacturing method for liquid crystal display panel provided by the embodiment of the present disclosure, the color filter substrate is further provided with a second ITO layer near the side of the array substrate.

Beneficial Effects

Beneficial effects of the present disclosure are as follows: in the liquid crystal display panel and the manufacturing method thereof provided by the present disclosure, the ITO layer is further covered with the optical spacer, which effectively reduces a risk of short-circuiting between the color filter substrate and the array substrate in the vicinity of the via hole structure, and further increases a yield rate of the liquid crystal display panel.

BRIEF DESCRIPTION OF DRAWINGS

In order to clearly illustrate the technical solutions in the embodiments or the prior art, the drawings used in the description of the embodiments or the description of the prior art will be briefly introduced below. Obviously, the drawings in the following description are only some embodiments of the disclosure. Other drawings can also be obtained from those skilled in the art based on these drawings without paying any inventive effort.

DETAILED DESCRIPTION OF EMBODIMENTS

Figure 1:
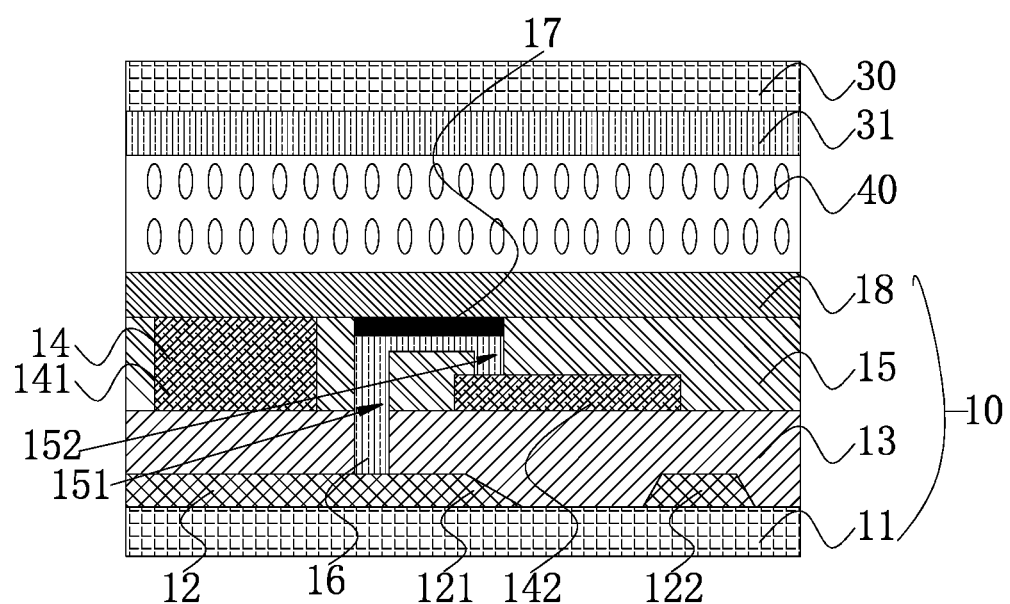
FIG. 1 is a schematic view of a section structure of a liquid crystal display panel of the present disclosure.

The following description of each embodiment refers to the additional drawings, in order to illustrate the specific embodiments that may be implemented by the present disclosure. The directional terms mentioned in this invention, such as [upper], [lower], [front], [post], [left], [right], [inside], [outside], [side], etc., are only refers to the direction of the additional drawings. Therefore, the terms are used to illustrate and understand the present invention, not to limit the present invention. In the drawings, structurally similar elements are denoted by the same reference numerals.

The present disclosure is directed to the technical problem that, in an existing liquid crystal display panel and a manufacturing method thereof, an ITO layer on a side of a color filter substrate is bent by external force, and, thereby, the ITO layer on the side of the color filter substrate is in contact with an ITO layer on a side of an array substrate, causing pixel electrodes to short-circuit, further resulting in a black screen phenomenon on the liquid crystal display panel. The present embodiments improve the defect thereof.

As shown in FIG. 1, which is a schematic view of a section structure of a liquid crystal display panel of the present disclosure. Wherein, the liquid crystal display panel includes an array substrate 10 and a color filter substrate 30, the array substrate 10 and the color filter substrate 30 are disposed opposite to each other, and a liquid crystal layer 40 disposed between the array substrate 10 and the color filter substrate 30. The array substrate 10 includes a glass substrate 11, a first metal layer 12, a gate insulating layer 13, a second metal layer 14, a first ITO layer 16, a first passivation layer 15, and a second passivation layer 18. The second metal layer 14 has a first sub-metal block 141 and a second sub-metal block 142, the first sub-metal block 141 are alternately arranged with and spaced apart from the second sub-metal block 142, and the first passivation layer 15 has a first via hole 151 and a second via hole 152.

Wherein, the first ITO layer 16 is further covered with an optical spacer 17, the first ITO layer 16 is electrically connected to the first metal layer 12 through the first via hole 151, and the first ITO layer 16 is electrically connected to the second sub-metal block 142 through the second via hole 152.

Specifically, the array substrate 10 is further configured with a plurality of scan lines, a plurality of data lines, and a plurality of pixel units, each of the pixel units including a plurality of thin-film transistors and pixel electrodes electrically connected to the thin-film transistors.

Specifically, the first metal layer 12 includes a gate 121 of the thin-film transistor and a gate scan line 122. A material of the first metal layer is generally a metallic material or other conductive material, such as, alloys, nitrides of metallic materials, oxides of metallic materials, nitrogen oxides of metallic materials, and stacked layers of metallic materials and other conductive materials. In a pattern design, the gate 121 of the thin-film transistor may be formed of a part of the gate scan line 122, or the gate 121 of the thin-film transistor may be formed of a branching pattern extending by the gate scan line 122.

Specifically, the gate insulating layer 13 is located between the first metal layer 12 and the second metal layer 14 to electrically insulate the first metal layer 12 from the second metal layer 14. A material of the gate insulating layer 13 may include inorganic dielectric material (for example, silicon oxide, silicon nitride, silicon oxynitride or other suitable inorganic dielectric material) or organic dielectric material.

Specifically, the second metal layer 14 includes a source and a drain of the thin-film transistor and further includes a plurality of data lines. A material of the second metal layer 14 is generally a metallic material or other conductive material, such as alloys, nitrides of metallic materials, oxides of metallic materials, nitrogen oxides of metallic materials, and stacked layers of metallic materials and other conductive materials. The second metal layer 14 has a first sub-metal block 141 and a second sub-metal block 142, the first sub-metal block 141 is alternately arranged with and spaced apart from the second sub-metal block 142, and the first sub-metal block 141 may be data lines and the second sub-metal block 142 may be source drain.

Specifically, the first passivation layer 15 is disposed on the gate insulating layer 13 and completely covers the second sub-metal block 142, and a thickness of the first sub-metal block 141 is the same as a thickness of the first passivation layer 15. A material of the first passivation layer 15 may include inorganic dielectric material (for example, silicon oxide, silicon nitride, silicon oxynitride or other suitable inorganic dielectric material) or organic dielectric material.

Specifically, the first passivation layer 15 has a first via hole 151 and a second via hole 152, the first via hole 151 exposes the first metal layer 12 through a part of the first passivation layer 15 and the gate insulating layer 13, and the second via hole 152 exposes the second sub-metal block 142 through a part of the first passivation layer 15.

Specifically, the first ITO layer 16 is disposed on the first passivation layer 15, the first ITO layer 16 is used as pixel electrode of the array substrate 10, the first ITO layer 16 is electrically connected to the first metal layer 12 through the first via hole 151, and the first ITO layer 16 is electrically connected to the second sub-metal block 142 through the second via hole 152.

Specifically, the first ITO layer 16 is further covered with a layer of the optical spacer 17, and an upper surface of the optical spacer 17 is aligned with an upper surface of the first passivation layer 15.

Specifically, the second passivation layer 18 is disposed on the first passivation layer 15 and completely covers the first sub-metal block 141 and the optical spacer 17. A material of the second passivation layer 18 may include inorganic dielectric material (for example, silicon oxide, silicon nitride, silicon oxynitride or other suitable inorganic dielectric material) or organic dielectric material.

Specifically, the color filter substrate 30 includes a second glass substrate and a color filter layer composed of a color filter pattern and a black array, and the color filter pattern may include a red filter pattern, a green filter pattern and a blue filter pattern. Specifically, a second ITO layer 31 is disposed on the color filter substrate 30, and the second ITO layer 31 is used as a common electrode of the liquid crystal display panel.

The liquid crystal display panel of the present disclosure is covered by a layer of the optical spacer on the pixel electrodes near the side of the array substrate, such that the upper surface of the optical spacer is aligned with the upper surface of the first passivation layer. Not only is a risk of short-circuit between the color filter substrate and the array substrate in the vicinity of the via hole structure reduced, but also a flatness of a film surface is improved, preventing unevenness of the surface of the first passivation layer caused by the addition of the optical spacer. The liquid crystal display panel of the present disclosure is further provided with a second passivation layer, which further isolates the pixel electrodes from a water vapor, thereby not only preventing a burn of the via hole caused by entry of the water vapor, but also preventing an electrochemical corrosion caused by participation of the water vapor.

Figure 2:
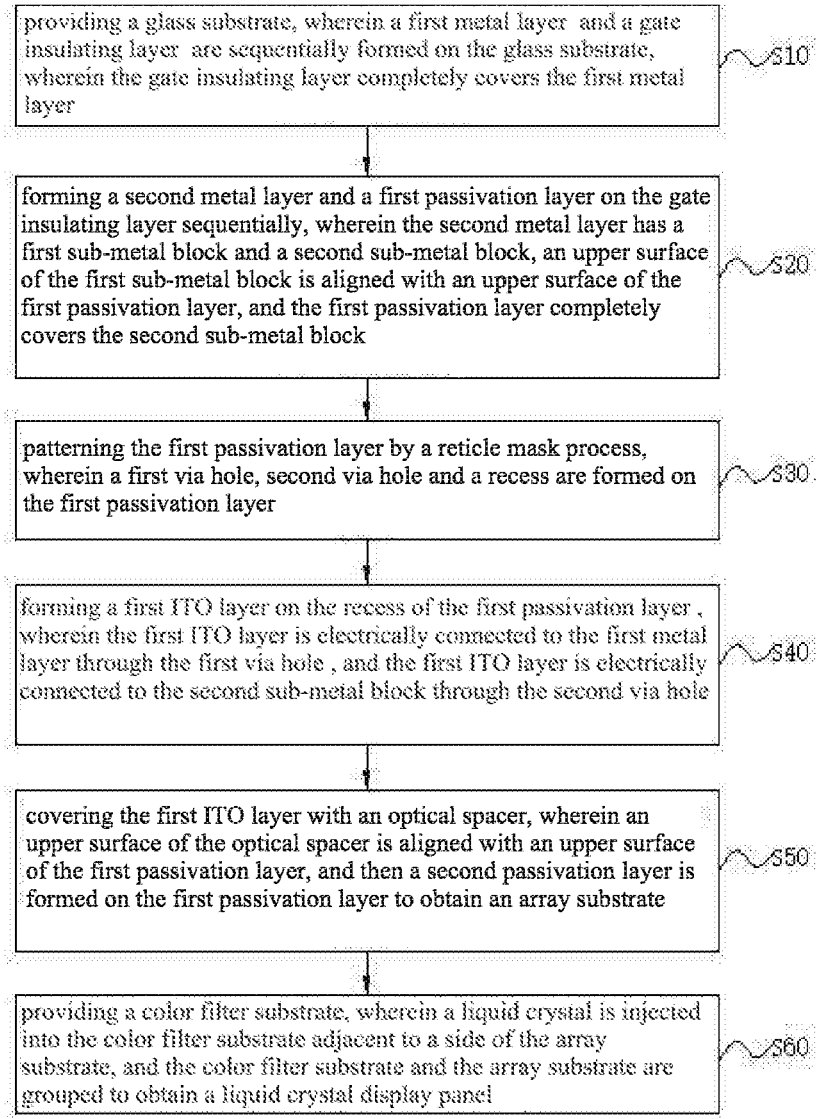
FIG. 2 is a flow chart of a manufacturing method for liquid crystal display panel of the present disclosure.

As shown in FIG. 2, which is a flow chart of a manufacturing method for liquid crystal display panel of the present disclosure, the method includes:

Step S10 of providing a glass substrate 21, wherein a first metal layer 22 and a gate insulating layer 23 are sequentially formed on the glass substrate 21, wherein the gate insulating layer 23 completely covers the first metal layer 22.

Figure 3A:
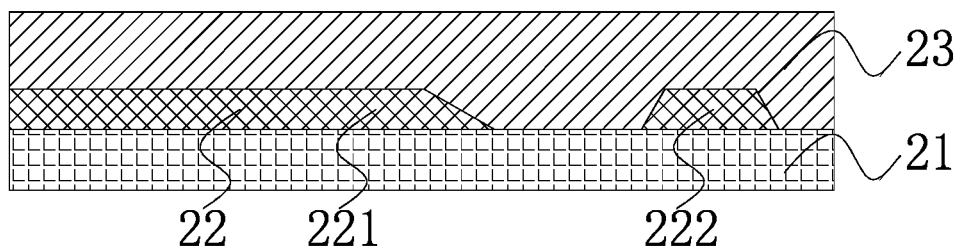
FIG. 3A-3F are schematic views of the manufacturing method for liquid crystal display panel in FIG. 2.

Specifically, the S10 further includes firstly, a step of providing a glass substrate 21, and a layer of the first metal layer 22 is deposited on the glass substrate 21. The first metal layer 22 includes a gate 221 of the thin-film transistor and a gate scan line 222. A material of the first metal layer 22 is generally a metallic material or other conductive material, such as alloys, nitrides of metallic materials, oxides of metallic materials, nitrogen oxides of metallic materials, and stacked layers of metallic materials and other conductive materials. In a pattern design, the gate 221 of the thin-film transistor may be formed of a part of the gate scan line 222, or the gate 221 of the thin-film transistor may be formed of a branching pattern extending by the gate scan line 122. Then, a gate insulating layer 23 is formed on the first metal layer 22, the gate insulating layer 23 completely covers the first metal layer 22, and the material of the gate insulating layer 23 may include inorganic dielectric material (for example, silicon oxide, silicon nitride, silicon oxynitride or other suitable inorganic dielectric material) or organic dielectric material, as shown in FIG. 3A.

Step S20 of forming a second metal layer 24 and a first passivation layer 25 on the gate insulating layer, 23 wherein the second metal layer 24 has a first sub-metal block 241 and a second sub-metal block 242, the first sub-metal block 241 is alternately arranged with and spaced apart from the second sub-metal block 242, an upper surface of the first sub-metal block 241 is aligned with an upper surface of the first passivation layer 25, and the first passivation layer 25 completely covers the second sub-metal block 242.

Figure 3B:
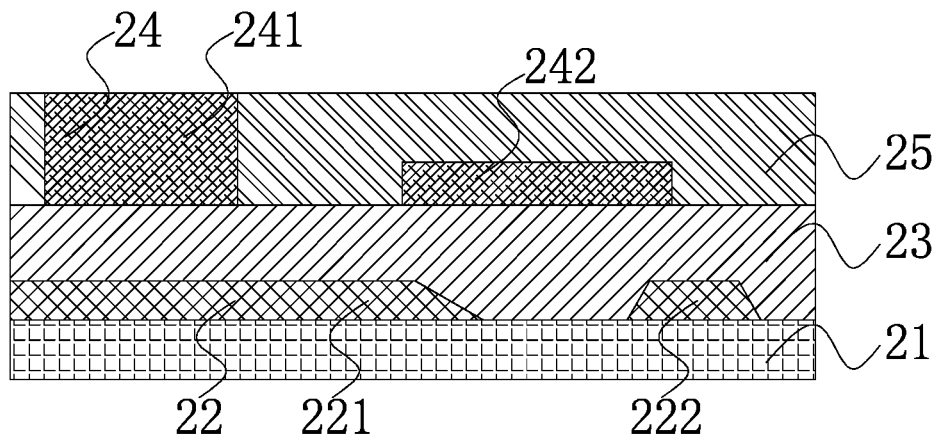
Figure 3C:
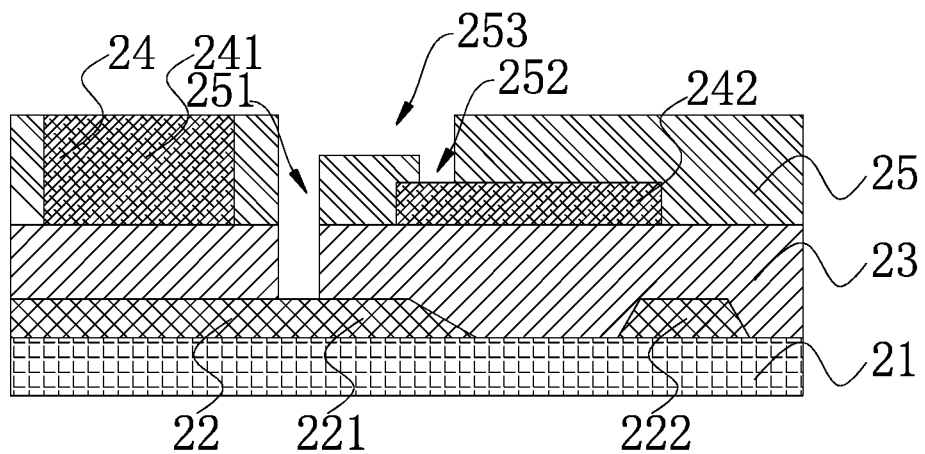

Specifically, the S20 further includes: a second metal layer 24 is formed on the gate insulating layer 23. The second metal layer 24 includes a source and a drain of the thin-film transistor and further includes a plurality of data lines. A material of the second metal layer 24 is generally a metallic material or other conductive material, such as alloys, nitrides of metallic materials, oxides of metallic materials, nitrogen oxides of metallic materials, and stacked layers of metallic materials and other conductive materials. The second metal layer 24 has the first sub-metal block 241 and the second sub-metal block 242, the first sub-metal block 241 is alternately arranged with and spaced apart from the second sub-metal block 242, and the first sub-metal block 241 may be the data lines and the second sub-metal block 142 may be a source drain. Then, the first passivation layer 25 is formed on the gate insulating layer 23, the upper surface of the first sub-metal block 241 is aligned with the upper surface of the first passivation layer 25, and the first passivation layer 25 completely covers the second sub-metal block 242. The material of the first passivation layer 25 may include an inorganic dielectric material (for example, silicon oxide, silicon nitride, silicon oxynitride or other suitable inorganic dielectric material) or an organic dielectric material, as shown in FIG. 3B.

Step S30 of patterning the first passivation layer 25 by a reticle mask process, wherein a first via hole 251, second via hole 252 and a recess 253 are formed on the first passivation layer 25.

Specifically, the S30 further includes: a step of patterning the first passivation layer 25 by a reticle mask process, wherein a first via hole 251, second via hole 252 and a recess 253 are formed on the first passivation layer 25. The first via hole 251 exposes the first metal layer 22 through a part of the first passivation layer 25 and the gate metal layer 23, and the second via hole 252 exposes the second sub-metal block 242 through a part of the first passivation layer 25, and the recess 253 is disposed between the first via hole 251 and the second via hole 252, so as to communicate the first via hole 251 with the second via hole 252, as shown in FIG. 3.

Step S40 of forming a first ITO layer 26 on the recess 253 of the first passivation layer 25, wherein the first ITO layer 26 is electrically connected to the first metal layer 22 through the first via hole 251, and the first ITO layer 26 is electrically connected to the second sub-metal block 242 through the second via hole 252.

Figure 3D:
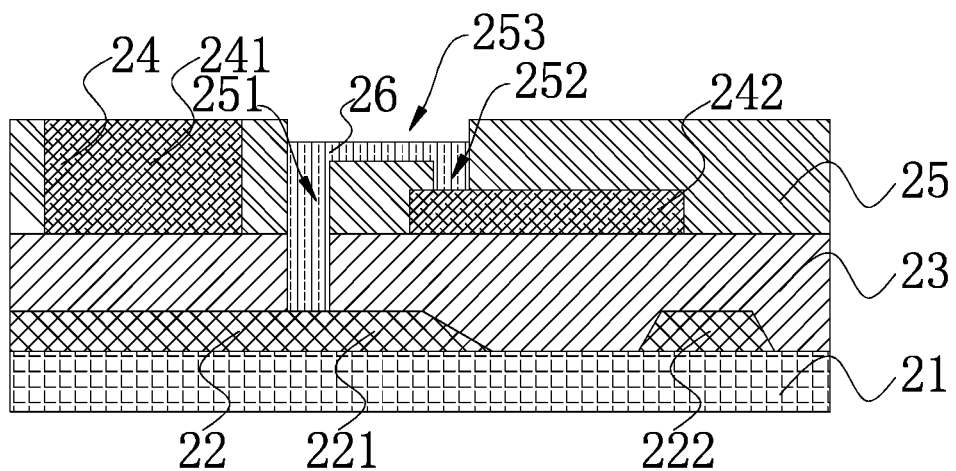

Specifically, the step S40 further includes: a step of forming the first ITO layer 26 on the recess 253 of the first passivation layer 25, wherein the first ITO layer 26 completely fills the first via hole 251 and the second via hole 252, the first ITO layer 26 is electrically connected to the first metal layer 22 through the first via hole 251, and the first ITO layer 26 is electrically connected to the second sub-metal block 242 through the second via hole 252, as shown in FIG. 3D.

Step S50 of covering the first ITO layer 26 with an optical spacer 27, wherein an upper surface of the optical spacer 27 is aligned with an upper surface of the first passivation layer 25, and then a second passivation layer 28 is formed on the first passivation layer 25 to obtain an array substrate.

Figure 3E:
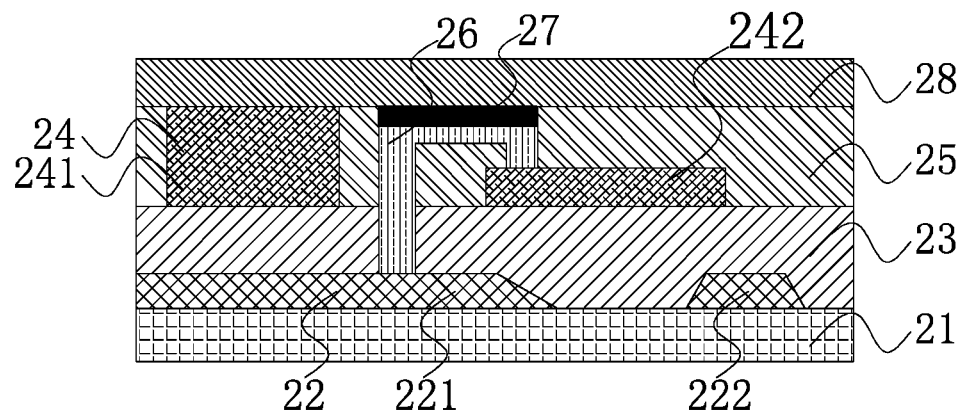

Specifically, the step S50 further includes: a step of covering the first ITO layer 26 with the optical spacer 27, wherein the upper surface of the optical spacer 27 is aligned with the upper surface of the first passivation layer 25. Then, the second passivation layer 28 is formed on the first passivation layer 25 to obtain the array substrate. Wherein, a material of the second passivation layer 28 is the same as a material of the first passivation layer 25, and the second passivation layer 28 completely covers the first sub-metal block 241 and the optical spacer 27, as shown in FIG. 3E.

Step S60 of providing a color filter substrate 31, wherein a liquid crystal 40 is injected into the color filter substrate 31 adjacent to a side of the array substrate, and the color filter substrate 31 and the array substrate are grouped to obtain a liquid crystal display panel.

Figure 3F:
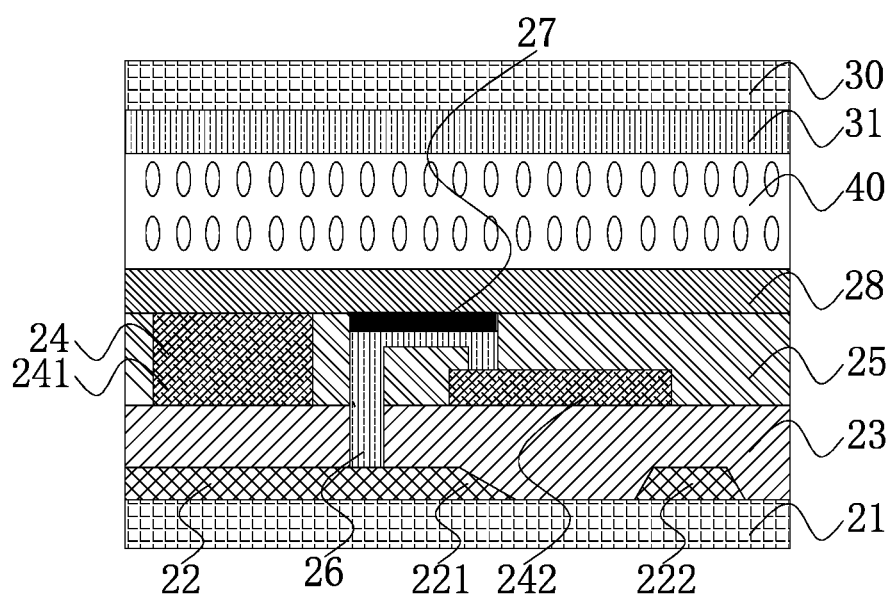

Specifically, the step S60 further includes: a step S60 of providing the color filter substrate 31, the color filter substrate 31 includes a second glass substrate and a color filter layer composed of a color filter pattern and a black array, and the color filter pattern may include a red filter pattern, a green filter pattern and a blue filter pattern. A liquid crystal 40 is injected into the color filter substrate 31 adjacent to the side of the array substrate, and the color filter substrate 31 and the array substrate are grouped to obtain a liquid crystal display panel. Wherein, a second ITO layer 31 is disposed on the color filter substrate 30, and the second ITO layer 31 is used as a common electrode of the liquid crystal display panel, as shown in FIG. 3F.

In the manufacturing method for liquid crystal display panel of the present disclosure, the pixel electrodes near the side of the array substrate is covered with a layer of the optical spacer, such that the upper surface of the optical spacer is aligned with the upper surface of the first passivation layer. Not only is a risk of short-circuit between the color filter substrate and the array substrate in the vicinity of the via hole structure reduced, but also a flatness of a film surface is improved, preventing unevenness of the surface of the first passivation layer caused by the addition of the optical spacer. The manufacturing method for liquid crystal display panel of the present disclosure further divides the passivation layer into two coatings, so that a passivation layer of a second coating completely covers the optical spacer, which further isolates the pixel electrodes from a water vapor, thereby not only preventing a burn of the via hole caused by entry of water vapor but also preventing an electrochemical corrosion caused by participation of the water vapor.

Beneficial effects of the present disclosure are as follows: in the liquid crystal display panel and the manufacturing method thereof provided by the present disclosure, the ITO layer is further covered with the optical spacer, which effectively reduces a risk of short-circuiting between the color filter substrate and the array substrate in the vicinity of the via hole structure, and further increases a yield rate of the liquid crystal display panel.

In summary, although the present disclosure has been disclosed in the above preferred embodiments, the above preferred embodiments are not used to limit the present disclosure. A person skilled in the art can make various modifications and refinements without departing from the spirit and scope of the present disclosure, and the scope of protection of the present disclosure is defined by the claims.

What is claimed is:

1. A liquid crystal display panel, comprising an array substrate and a color filter substrate disposed opposite to each other, and a liquid crystal layer disposed between the array substrate and the color filter substrate, wherein the array substrate comprises: a glass substrate, a first metal layer, a gate insulating layer, a second metal layer, a first indium tin oxide (ITO) layer, a first passivation layer, and a second passivation layer, wherein the second metal layer has a first sub-metal block and a second sub-metal block, the first sub-metal block are alternately arranged with and spaced apart from the second sub-metal block, the first passivation layer has a first via hole and a second via hole, and a thickness of the first sub-metal block is the same as a thickness of the first passivation layer;

wherein, the first ITO layer is further covered with an optical spacer, the first ITO layer is electrically connected to the first metal layer through the first via hole, and the first ITO layer is electrically connected to the second sub-metal block through the second via hole, wherein an upper surface of the optical spacer is aligned with an upper surface of the first passivation layer.

2. The liquid crystal display panel as claimed in claim 1, wherein the first via hole exposes the first metal layer by a part of the first passivation layer and the gate insulating layer, and the second via hole exposes the second sub-metal block by a part of the first passivation layer.

3. The liquid crystal display panel as claimed in claim 1, wherein a material of the spacer is organic resin.

4. The liquid crystal display panel as claimed in claim 1, wherein the second passivation layer is disposed on the first passivation layer and completely covers the first sub-metal block and the optical spacer.

5. The liquid crystal display panel as claimed in claim 1, wherein the color filter substrate is further provided with a second ITO layer near a side of the array substrate.

6. A manufacturing method for liquid crystal display panel, comprising:
S10, providing a glass substrate on which a first metal layer and a gate insulating layer are sequentially formed, wherein the gate insulating layer completely covers the first metal layer;
S20, forming a second metal layer and a first passivation layer on the gate insulating layer, wherein the second metal layer has a first sub-metal block and a second sub-metal block, the first sub-metal block is alternately arranged with and spaced apart from the second sub-metal block, an upper surface of the first sub-metal block is aligned with an upper surface of the first passivation layer, and the first passivation layer completely covers the second sub-metal block;

S30, patterning the first passivation layer by a reticle mask process, wherein a first via hole, second via hole and a recess are formed on the first passivation layer;

S40, forming a first ITO layer on the recess of the first passivation layer, wherein the first ITO layer is electrically connected to the first metal layer through the first via hole, the first ITO layer is electrically connected to the second sub-metal block through the second via hole;

S50, covering the first ITO layer with an optical spacer, wherein an upper surface of the optical spacer is aligned with an upper surface of the first passivation layer, and then a second passivation layer is formed on the first passivation layer to obtain an array substrate;

S60, providing a color filter substrate, wherein a liquid crystal is injected into the color filter substrate adjacent to a side of the array substrate, and the color filter substrate and the array substrate are grouped to obtain a liquid crystal display panel.

7. The method as claimed in claim 6, wherein the first via hole exposes the first metal layer by a part of the first passivation layer and the gate metal layer, and the second via hole exposes the second sub-metal block by a part of the first passivation layer.

8. The method as claimed in claim 6, wherein the color filter substrate is further provided with a second ITO layer near the side of the array substrate.

* * * * *